United States Patent Office 3,224,981
Patented Dec. 21, 1965

3,224,981
SUPPORTED COPPER OXIDE AND PALLADIUM CATALYST COMPOSITION
Ruth E. Stephens, Detroit, Daniel A. Hirschler, Jr., Birmingham, and Frances W. Lamb, Detroit, Mich., assignors to Ethyl Corporation, New York, N.Y., a corporation of Virginia
No Drawing. Filed Dec. 29, 1961, Ser. No. 163,077
6 Claims. (Cl. 252—460)

This application is a continuation-in-part of application Serial No. 99,380, filed March 30, 1961, now abandoned, which is a continuation-in-part of application Serial No. 26,699, filed May 4, 1960, now abandoned.

This invention relates to copper catalysts. More particularly the invention relates to supported copper catalysts containing minor amounts of palladium. The invention also relates to a method of substantially oxidizing the hydrocarbon and carbon monoxide constituents which are present in the exhaust gas of internal combustion engines.

In recent years, extensive research has been devoted to the alleviation of air pollution in many metropolitan areas. Part of this effort has been directed to methods of reducing the unburned hydrocarbons and carbon monoxide emitted with the exhaust gas of internal combustion engines. These and other constituents of the exhaust gas stream, once discharged to the atmosphere, are believed to enter into photochemical reactions thereby contributing to so-called smog formation. Smog irritants have been established with some degree of certainty to be deleterious to comfort and health.

Various methods have been put forth toward eliminating unburned hydrocarbons and carbon monoxide from the exhaust gas stream. Among these are suggestions of various catalytic converter systems to accomplish this purpose. With such systems, the exhaust gases are passed directly over a catalytic bed wherein the noxious materials are converted to an inactive form. However, these systems have their shortcomings in that catalyst efficiency is low, or the catalyst may not become active until higher temperatures are reached, or the catalyst activity is markedly reduced due to the many potential catalyst poisons found in the exhaust gas stream, or the catalyst may not be stable for prolonged periods of time at high temperatures.

In earlier filed applications Serial No. 26,699, and Serial No. 99,380, we described and claimed catalysts which under certain conditions proved to be especially effective for the oxidation of hydrocarbon and carbon monoxide constituents of exhaust gases. Those catalysts consisted of "transitional" activated alumina having a surface area of at least 75 square meters per gram and a silica content not more than 5 percent on which was impregnated or with which was mixed copper oxide in an amount such that the catalyst system contained between 0.5 and 25 percent of copper as said oxide. It was also found that under certain conditions the inclusion of a small amount of another metal or metals further enhanced the properties of those catalysts. These additional metals included the metals of Group VIII of the Periodic Table of the Elements. As described therein, those catalysts promoted the oxidation of a great percentage of hydrocarbons and carbon monoxide emitted with the exhaust gas stream. Moreover, those catalysts were extremely resistant to the many catalyst poisons contained in the exhaust gas stream of current internal combustion engines.

The present invention relates to copper catalysts containing minor amounts of palladium which are unusually active at extremely low temperatures. In this and other respects, the present catalysts are superior to other copper catalysts, even those containing other Group VIII metals.

It is an object of this invention to provide novel oxidation catalysts. Another object is to provide oxidation catalysts which are active at extremely low temperatures and which retain this high efficiency during long periods of use. Another object is to provide a method to substantially oxidize the unburned hydrocarbons and carbon monoxide found in the exhaust gas stream of internal combustion engines.

The objects of this invention are accomplished by providing novel catalysts especially adapted to substantially oxidize the unburned hydrocarbons and carbon monoxide constituents of the exhaust gas of internal combustion engines, said catalysts comprising a suitable carrier impregnated or mixed with from about 0.5 to 25 percent copper in an oxide form and from about 0.01 to about 3 percent palladium. The present invention also embodies the method of substantially oxidizing unburned hydrocarbons and carbon monoxide from the exhaust stream of internal combustion engines which comprises passing said exhaust over and through the above-described catalysts.

By the use of this invention, substantial amounts of the carbon monoxide are converted to carbon dioxide and a great percentage of the unburned hydrocarbons are completely oxidized to carbon dioxide and water. Further, the catalysts of this invention are active over a wide temperature range and under a variety of engine operating conditions. Other important aspects of the catalysts of this invention are excellent thermal stability at extremely high temperatures and that they do not catalyze the oxidation of nitrogen. Still other advantages of the present catalysts is their resistance to the many potential catalyst poisons in exhaust gas such as the products of combustion of organolead antiknock agents and the many sulfur compounds found in commercial gasoline. In spite of such an extremely adverse environment, the present catalysts operate efficiently over long periods of time.

The most outstanding advantage of the catalysts of this invention is their high degree of efficiency at extremely low temperatures. Although certain other catalysts composed of copper and of copper plus additional promoter metals have many of the properties enumerated above, it has been discovered that the present copper-palladium system is active at much lower temperatures. Moreover, and perhaps more important, the present copper-palladium catalysts retain this high degree of efficiency at extremely low temperatures over long periods of use. Other copper catalysts, even those promoted with metals having properties similar to palladium with use, are active only at increasingly higher temperatures.

In suburban areas where an exhaust catalyst device finds great utility, automobile trips are oftentimes relatively short and the engine is operated under comparatively low temperatures. Moreover, under cold conditions, a majority of modern automobiles utilize an automatic choke and thereby operate under an extremely rich fuel-air mixture. Investigations have shown that the exhaust gas during this warm-up period will contain a much higher percentage of unburned hydrocarbons and carbon monoxide as compared to emissions under steady-state, equilibrium conditions. Thus, in these applications, it is very important to have the catalyst operate effectively at as low a temperature as possible. It is under these conditions that maximum benefits are obtained from the use of the present catalysts.

The catalysts contemplated by this invention contain from about 0.5 to 25 percent copper and from about 0.01 to 3 percent palladium. However, in many applications an optimum concentration of these metals is from about 2 to 10 percent copper and from 0.03 to one percent palladium. On a cost-effectiveness basis, the most preferred concentration range is from about 4 to 8 percent copper and from about 0.05 to 0.2 percent palladium. With a freshly prepared catalyst, the copper is present in one of its oxidized states; i.e., cupric or cuprous oxide. The palladium may be present in the metallic state or as an oxide. When in actual operation, the catalyst system is very complex, but the metals no doubt fluctuate between various oxidation states depending upon temperature and the nature of the environment.

A variety of materials may be used as the carrier for the catalysts of this invention. Included among these are aluminum oxides and hydroxides, transitional aluminas, aluminum silicates, aluminum gels, magnesium gels, oxides of other metals such as thoria, magnesia, zirconia and the like. It is understood that the benefits afforded by this invention are not necessarily uniform for all carriers, but that the efficacy may vary for different carriers. In an exhaust gas application, alumina-type carriers are preferred. These materials are in general compatible with the palladium-copper system, the resulting catalyst being thermally stable at extremely high temperatures and yielding all-around superior results. Included among the alumina carriers are porous aluminum oxides in various states of oxidation and hydration as well as aluminum hydroxide. The alumina may be synthetically prepared or may be naturally occurring.

Of the alumina carriers, we prefer to use the activated type. In the most preferred embodiment, we prefer to use activated alumina known in commerce as transitional alumina. These activated aluminas are metastable forms which in general are produced by heating of alpha or beta alumina trihydrate or alpha alumina monohydrate. As these materials are heated, phase changes take place and on prolonged heating and particularly at very high temperatures such as 1150° C., they are converted into the so-called "alpha alumina" which is the stable, refractory-type of alumina. We prefer to use the intermediate materials which are much more active than the alpha alumina. Dependent upon the starting material and the degree of conversion, these transitional aluminas are known as gamma, delta, eta, theta, kappa, chi and rho. This nomenclature is set forth in the phamplet, "Alumina Properties", Russell et al., published by the Aluminum Company of America, Pittsburgh, Pennsylvania, 1956. Any of the above-listed transitional aluminas or mixtures thereof are preferred materials for the catalysts of this invention. In most cases the materials used as the carriers of this invention are a mixture of various types of transitional aluminas.

In addition to the inherent transitional nature of the alumina itself, we prefer those catalyst carriers having a surface area of at least 75 square meters per gram. While in some cases we can use alumina base carriers containing as much as 10 percent silica, we prefer those having a silica content of from about 0.1 to 5 percent. Catalysts prepared using the carriers within these preferred limits often have superior properties with respect to longevity and resistance to the poisoning effects of contaminants found in the exhaust gas stream, and also are heat stable and operate efficiently at extremely high temperatures.

The catalysts of this invention may be prepared in a variety of ways. They may be prepared by contacting a suitable carrier with a solution, not necessarily aqueous, of organic or inorganic compounds of copper and of palladium, allowing sufficient time for impregnation, and then subjecting the mass to appropriate conversion treatment. The conversion consists of thermal treatment to remove free water from the system, and to convert the copper and the palladium to their active forms. It is also possible to contact the carrier successively with a separate solution of each metal and then subject the mass to conversion treatment. Alternatively, the carrier may be contacted with a solution of one metal, subjected to conversion treatment, and then contacted with a solution of the second metal and finally subjected to further conversion. With this successive impregnation technique, the carrier may be first contacted with a solution of either metal. However, in order to obtain maximum benefits from the more expensive palladium, it is preferable that the carrier be first contacted with the copper solution and then impregnated with the palladium solution.

The catalysts can be prepared from copper nitrates, carbonates, acetates, sulfates, hydroxides, lactates, formates, oxalates, propionates, benzoates and the like. Organocopper compounds such as cyclopentadienyl copper triethyl phosphine, bis ethylamino methylene acetone copper II, bis acetyl acetonate and the like can also be used. Similarly, salts of palladium such as palladium chloride, bromide, nitrate and palladium complexes such as diamminepalladium hydroxide and tetrammine palladium chloride may be used as the source of palladium. The carrier material is impregnated with solutions of the above materials and the resulting catalyst mass is subjected to elevated temperatures to convert the copper and palladium to their active forms. Other methods of preparing mixtures of an appropriate carrier, copper oxides and palladium can also be used. For example, copper oxide and palladium may be mixed in a dry state with an appropriate carrier. The mixture may then be extruded at elevated pressures and temperatures to yield a catalyst in pellet form. When a transitional alumina carrier is used, copper oxide and palladium may be incorporated therein during the conversion of the starting alumina to the transitional form.

A preferred method of preparing the catalysts constitutes starting with a copper salt of oxide and forming an ammoniacal solution whereby a deeply violet-colored, copper-ammonia complex is formed. A palladium compound, preferably palladium nitrate, is then dissolved in this solution. The carrier material is then impregnated with the solution and gradually heated to dryness. The resulting catalyst composite is then heated to elevated temperatures, the copper complex and palladium nitrate decomposing to yield the active copper oxide and palladium forms. Catalysts prepared by this method are generally superior to catalysts prepared by more conventional techniques. Among others, this method allows greater amounts of copper to be put into solution per unit volume.

A particularly convenient and desirable method of producing the catalysts which constitutes a preferred method is starting with basic cupric carbonate usually either the malachite or azurite forms, or a mixture of both. When this material is mixed with a solution of ammonium carbonate and ammonia, a deeply violet-colored ammonium carbonate complex is formed. A palladium salt is added directly to the solution or may be pre-dissolved in ammonia and then added to the solution. The carrier material is then impregnated with the common solution of copper and palladium compounds which compounds are then decomposed by heating. Catalysts prepared in this manner have the advantages of being more resistant to attrition and of having better stability and longer life. Also, the preferred method, besides producing superior catalysts, has the advantages of starting with relatively inexpensive materials, being able to produce a highly concentrated solution of the copper complex, and easily decomposing the complex to the active copper oxide form.

The following examples are not meant to limit the scope of this invention but are offered to show some of the preferred catalysts and methods for their preparation.

EXAMPLE I

KA-101 activated transitional alumina (sold commercially by the Kaiser Aluminum Company) was used as the carrier material for the catalyst of this example. This transitional alumina has about 95.4 weight percent $Al_2O_3$, about 0.02 percent $SiO_2$, about 0.02 percent $Fe_2O_3$, about 0.002 percent $TiO_2$ and 0.40 percent $Na_2O$. On ignition it loses about 4.2 percent of its weight. It is a spherical form of transitional alumina having a surface area of about 360 square meters per gram. Its bulk density is about 43 lbs./cu. ft., it has a dynamic sorption of about 19.7 percent, and its crushing strength is about 66 percent. It is prepared by the carefully controlled calcination of beta trihydrate and its principal constituents are eta alumina and alpha monohydrate. In this example, material passing through a six-mesh screen but retained by an eight-mesh screen (Tyler Standard Screen Scale Sieves) was used.

At room temperature, 740 parts of basic cupric carbonate, $(CuCO_3 \cdot CuOH_2)$ were dissolved in an aqueous solution containing 300 parts of ammonium carbonate and 325 parts of ammonia. 20 parts of palladium nitrate were dissolved in the solution. 8450 parts of KA–101 transitional alumina were immersed in the solution for a sufficient time to allow thorough impregnation. The temperature of the mixture was then gradually raised to drive-off all the free water. The catalyst composite was then subjected to thermal decomposition at a temperature of 650° C. for one-half hour. Water, carbon dioxide, ammonia and oxides of nitrogen were evolved. The finished catalyst comprised a major portion of KA–101 alumina, about 5 percent copper in an oxide form, and about 0.1 percent palladium.

EXAMPLE II

An aqueous solution was prepared containing 121 parts of cupric nitrate, $Cu(NO_3)_2 \cdot 3H_2O$, 0.15 part of palladium as palladium nitrate, 21 parts of phosphoric acid and 4 parts of hydrogen bromide. After adding 650 parts of KA–101 transitional alumina, the solution was heated to dryness. The catalyst composite was then heated to 600° C. for 45 minutes. The finished catalyst contained a major portion of KA–101 alumina, about 4.6 percent copper in an oxide form and 0.02 percent palladium.

EXAMPLE III

Fourteen parts of cupric carbonate were added to an aqueous solution containing 8 parts of ammonium carbonate and 10 parts of ammonia. 1.6 parts of palladium nitrate were dissolved in a 30 percent ammonia solution. The two solutions were then mixed. 660 parts of KA–101 transitional alumina were immersed therein and the solution heated to dryness. The resulting catalyst composite was then heated at 500° C. for one hour. The finished catalyst contained 1.5 percent copper in an oxide form and 0.11 percent palladium.

EXAMPLE IV

A solution containing 193 parts of cupric carbonate, 90 parts of ammonium carbonate, 105 parts of ammonia and 0.75 part of palladium as palladium nitrate was prepared. 650 parts of KA–101 transitional alumina was immersed therein and the solution heated to dryness. The resulting catalyst composite was then heated at 600° C. for one hour. The finished catalyst contained about 15 percent copper in an oxide form and about 0.1 percent palladium.

EXAMPLE V

An aqueous solution is prepared containing 45 parts of copper as copper acetate. Six hundred parts of magnesia is immersed in this solution and allowed to stand so as to be thoroughly impregnated. The solution is then heated to dryness. The resulting catalyst composite is then heated at 500° C. for one-half hour, cooled and immersed in an aqueous solution containing 20 parts of palladium as palladium chloride. This solution is heated to dryness and then subjected to a temperature of 650° C. for one hour. The finished catalyst comprises a major portion of magnesia impregnated with about 7 percent copper and 3 percent palladium.

EXAMPLE VI

Aluminum silicate is used as the carrier in this example. Six hundred parts of this material are immersed in a solution containing 155 parts of copper as basic cupric carbonate, 160 parts of ammonium carbonate and 175 parts of ammonia. Two parts of palladium as palladium nitrate are dissolved in the solution. The solution is heated to dryness and the resulting composite is then subjected to temperatures of 750° C. for one hour. The finished catalyst contains a major portion of aluminum silicate containing about 23 percent copper and 0.3 percent palladium.

EXAMPLE VII

F–1 grade alumina (sold commercially by the Aluminum Company of America) is used as the carrier in this example. This transitional alumina has about 92 percent $Al_2O_3$ and about 0.09 percent $SiO_2$. On ignition it loses about 6 percent of its weight. It is a granular material having a surface area of about 210 square meters per gram. Its bulk density (packed) is about 55 pounds per cubic foot and its specific gravity is 3.3. It is prepared by calcination of alpha alumina trihydrate and contains a mixture of transitional aluminas described earlier in this specification.

Four hundred parts of F–1 alumina are immersed in a solution containing 50 parts of copper as copper nitrate and one part of palladium as palladium nitrate. By gentle heat the free water is driven off and the resulting catalyst composite is then heated at 675° C. for 1½ hours. The finished catalyst contains about 11 percent copper and 0.2 percent palladium.

A variety of catalysts were tested using the exhaust gas of a CFR L-head, 7:1 compression ratio, single cylinder engine. The exhaust gas stream was passed through a catalyst bed consisting of 42 cubic inches of the catalyst. A secondary air supply to provide oxygen for the oxidation was introduced into the exhaust gas stream just prior to the catalyst bed. The engine was continuously cycled 50 seconds under idle conditions and 150 seconds at wide-open throttle. In general, the tests were carried out for a period of 80 hours. The operating conditions for the tests were as follows:

*Table I.—Engine operating conditions*

|  | Idle | Wide-open Throttle |
|---|---|---|
| Engine speed, r.p.m. | 750 | 1,140 |
| Volume of exhaust gas SCFH | 90 | 250 |
| Volume of secondary air SCFH | 40 | 40 |
| Hydrocarbon (vol. percent) | 0.04 | 0.03 |
| $CO_2$ | 4 | 10 |
| CO | 7 | 3 |
| $O_2$ | 9 | 4.5 |
| Space velocity (v./v./hr.) | 5,350 | 11,900 |

The fuel used to operate the engine and the additives contained therein were chosen so as to severely test the oxidation properties of the catalyst. Our experience and that of other workers has shown that fuels containing high amounts of sulfur and high amounts of tetraethyllead impose a severe test on catalyst efficiency and longevity. Accordingly, the fuel used in this test contained 0.12 weight percent sulfur and 12 grams of lead as tetraethyllead. The conditions of this test are much more severe than a catalyst would be subjected to in a commercial application wherein fuels normally contain from about 2 to 4 grams of lead per gallon and contain from about 0.03 to 0.07 weight percent sulfur.

The composition of the fuel on which the engine was operated during this test is as follows:

*Table II.—Fuel composition*

ASTM Distillation: °F.
    Initial boiling point _____ 97
    10 percent evaporated _____ 148
    50 percent evaporated _____ 266
    90 percent evaporated _____ 327
    Final boiling point _____ 422

Hydrocarbon type, vol. percent:
    Aromatics _____ 40
    Olefins _____ 4
    Saturates _____ 56
Sulfur, wt. percent _____ 0.12
Lead content, g./gal. as tetraethyllead _____ 12.0
Ethylene dichloride, theories _____ 1.0
Ethylene dibromide, theories _____ 0.5

The above-described tests were used to determine catalyst activity and longevity when continually exposed to an exhaust gas stream of a composition typical of that emitted by a commercial vehicle. Two of the more important catalyst properties investigated were (1) the ability of the catalyst to promote the desired reaction under wide-open throttle conditions when the bed had attained equilibrium temperatures and (2) the minimum temperature required for the catalyst to significantly promote the oxidation reaction. Characteristics 1 and 2 were determined both for a fresh catalyst and during periodic intervals when the catalyst was in actual use.

The engine was operated on the above-described cycle until operating temperatures were achieved. The engine was then operated at wide-open throttle and when an equilibrium bed temperature was reached, the concentration of hydrocarbons and carbon monoxide in the exhaust gas stream prior to and after passage through the catalyst bed were determined. Under these conditions, the bed temperature was in the range of from about 600 to 1700° F. depending upon the degree to which the oxidation reaction was promoted by various catalysts. The engine was continually operated on the above-described cycle and at approximately 20-hour intervals the oxidation efficiencies were again determined. The results of this test using several different catalysts are shown in Table III.

The catalysts shown in Table III are all transitional alumina base catalysts impregnated with various metals. Catalysts A and B contain both copper oxide and palladium and are within the scope of this invention. Catalyst C (copper oxide), catalyst D (palladium) and catalyst E (copper oxide and platinum) are not catalysts of this invention.

At the beginning of the test, catalysts A, B and C were superior, D the palladium catalyst, being decidedly inferior and E being intermediate. As the test progressed, the activity of all catalysts diminished to varying degrees. The activity of D, the palladium catalyst, diminished the most severely and after 60 hours this catalyst was essentially inactive. C, the copper catalyst, had a relatively high activity at the 80-hour point. However, catalyst B, containing both copper and palladium, was surprisingly superior to C, the copper catalyst. In other words although palladium is itself relatively inefficient, it has the property of further increasing the activity of the highly active copper oxide catalyst. Evidently this benefit is obtained for catalysts containing greater amounts than 0.02 percent palladium, for catalyst A containing this amount of palladium was slightly inferior to the straight copper oxide catalyst. However, the inclusion of this concentration of palladium is still considered beneficial, for the minor reduction in efficiency under equilibrium conditions is more than compensated by the improved performance at low temperatures. This latter feature will be subsequently discussed.

The data obtained on catalyst E show that under these conditions, while platinum can improve the properties of the copper catalyst with respect to oxidation of carbon monoxide, it is detrimental with respect to the oxidation of hydrocarbons.

In summary, the data of Table III show that the relatively high efficiency of a copper oxide catalyst can be still further improved by including palladium therein. This is surprising for palladium itself is relatively inefficient in promoting the desired reaction. Furthermore, platinum, which otherwise has many properties similar to palladium, is inferior to palladium when included in a copper oxide catalyst. A straight palladium catalyst is unacceptable for an exhaust gas application because of its low efficiency under these conditions.

In another part of this series of tests, the temperature at which the catalyst significantly promoted the oxidation of hydrocarbons and carbon monoxide was determined in the following manner: The engine was shut down and allowed to cool to room temperature; then the engine was

*Table III.—Oxidation efficiencies of various alumina base catalysts*

WIDE-OPEN THROTTLE EQUILIBRIUM CONDITIONS

| Catalyst | A | B | C | D | E |
|---|---|---|---|---|---|
| Composition, metal, (wt. percent) | Cu(4.6) Pd(0.2) | Cu(5.0) Pd(0.1) | Cu(6.5) | Pd(0.15) | Cu(1.2) Pt(0.23) |
| Hydrocarbon Reduction, Percent | | | | | |
| Test Hours: | | | | | |
| 0 | 72 | 74 | 77 | 51 | 62 |
| 20 | 61 | 59 | 64 | 25 | 43 |
| 40 | 45 | 51 | 50 | 14 | 38 |
| 60 | 26 | 46 | 40 | 7 | 28 |
| 80 | 15 | 37 | 30 | (¹) | 25 |
| Carbon Monoxide Reduction, Percent | | | | | |
| 0 | 90 | 94 | 97 | 73 | 92 |
| 20 | 71 | 77 | 78 | 38 | 77 |
| 40 | 57 | 68 | 63 | 23 | 76 |
| 60 | 44 | 59 | 55 | 17 | 61 |
| 80 | 31 | 53 | 44 | (¹) | 56 |

¹ Not determined.

started up and allowed to idle at about 900 r.p.m. By means of thermo-couples appropriately located, temperatures were determined for the exhaust gas stream just prior to entering the catalyst bed and also catalyst bed temperatures were measured. The incoming exhaust gas temperature varied from about 300° F. at the start and increased gradually to about 600° F. as equilibrium conditions were approached. The catalyst bed temperatures, due to transfer of sensible heat from the exhaust gas, gradually rose but, of course, were lower than the temperature of the exhaust gas. However, as bed temperature was raised to the catalyst activation temperature, the catalyst became active and promoted the oxidation reaction with the attendant release of the heat of reaction. This further heated the catalyst bed, resulting in more efficient oxidation with the release of still higher amounts of heat. In this manner, soon after the catalyst bed reached the activation temperature, due to the heat released by the oxidation reactions, the bed temperature exceeded the temperature of the incoming exhaust gas.

As a convenient criterion for comparative purposes, the catalyst was said to be active when the temperature of the catalyst bed exceeded the temperature of the incoming exhaust gas by 50° F. Thus, if the inlet exhaust gas temperature was 500° F., and due to the heat released by the oxidation reaction the catalyst bed temperature was 550° F., the catalyst was said to have an "activation temperature" of 500° F. Of course the catalyst promotes the oxidation reaction at temperatures below its activation temperatures, but to a lesser degree.

Another index of catalyst activity is the catalyst bed temperature for a given inlet exhaust gas temperature. In other words, at a given inlet exhaust gas temperature, the more efficient catalyst will promote a greater degree of oxidation, thereby releasing a larger amount of heat which is reflected in a higher catalyst bed temperature.

A series of transitional alumina base catalysts impregnated with different metals were subjected to the above-described techniques to determine their activation properties. The results of these tests are shown in Table IV.

In addition to catalysts A-E previously described, data are shown in Table IV on transitional-alumina base catalysts impregnated with copper-iridium, copper-iron, copper-iron-palladium and copper-nickel (catalysts F-I respectively). The data of this table show that as the test progressed, generally, higher temperatures were required to activate the catalysts. For example, catalyst C, copper on alumina, at the beginning of test (0 hours) had an activation temperature of 480° F. i.e., at an inlet exhaust gas temperature of 480° F., the catalyst bed was 50° above this temperature. However, after the catalyst had been in use for 80 hours, an inlet exhaust gas temperature of 610° was required before the catalyst bed temperature rose 50° above this level. This performance was markedly improved by including palladium in the copper catalyst. Thus the activation temperatures of catalysts A and B, copper catalysts containing 0.02 and 0.1 percent palladium respectively, were 440 and 430° F. This represents an improvement of about 50° over the performance of the straight copper catalyst. The improvement was even more outstanding at the 80-hour point wherein catalysts A and B had activation temperatures of 500 and 510° F. compared to 610° for catalyst C. Thus the addition of palladium lowered the activation temperatures of the copper catalysts by about 100°. Platinum, iridium, iron and nickel (catalysts E, F, G and I) showed some effectiveness toward improving the activation temperatures of copper catalysts, but to a lesser extent than did palladium. This is especially true with the latter three catalysts which showed only nominal improvements.

After 80 hours of test, catalyst bed temperatures were determined when the inlet exhaust gas temperatures reached 540° F. This is an extremely important index of catalyst efficiency at low temperatures, for although two catalysts may both be active at the same temperature as defined above, their degree of activities may be quite different. At a given inlet exhaust gas temperature, catalyst bed temperature is directly related to catalyst activity, the more efficient catalyst producing an increasingly higher bed temperature.

Data for this portion of the test are shown in the bottom portion of Table IV. These data more strikingly attest to the higher degree of activation of the copper-palladium catalysts. At inlet exhaust gas temperature of 540° F., the catalyst bed temperature for the straight copper catalyst (C) was 550° F. and for the straight palladium catalyst (D) 800° F. Incorporating copper and palladium in the same catalyst resulted in vastly improving catalyst effectiveness as reflected by the much higher bed temperatures. Thus using catalyst A, which contained 4.6 percent copper and only 0.02 percent palladium, catalyst bed temperature was 940° F. This represents an improvement of 140° over the straight palladium catalyst and 390° over the straight copper catalyst. Using catalyst B, which contained 5 percent copper and 0.1 percent palladium, bed temperatures rose to 1235° F., or 435° higher than the straight palladium catalyst and 685° higher than the straight copper catalyst. This improvement is still more significant when it is noted that the concentrations of copper in catalyst C, and of palladium in catalyst D were both higher than the concentration of these metals in catalysts A or B.

The data on the remaining catalysts further demonstrate the uniqueness of palladium in improving the activation properties of copper catalysts. While it would be expected that palladium, platinum and iridium, all members of the same family, would have similar properties in this respect, such was not the case. While bed temperatures for the copper-platinum catalyst (E) showed a temperature of 850°, this is quite inferior to the preferred copper-palladium catalyst (B) which had a temperature of 1235° F. The copper-iridium catalyst (F) showed extremely poor results, bed temperatures reaching only 540° F. Similarly, the results with the copper-iron and copper-nickel catalysts (G and I respectively) were poor, reaching only 525 and 545° F. respectively.

Of further interest are the results obtained with catalyst H, containing 8.6 percent copper, 3.8 percent iron

*Table IV.—Activation temperatures of alumina base catalysts*

| Catalyst | A | B | C | D | E | F | G | H | I |
|---|---|---|---|---|---|---|---|---|---|
| Composition, metal, (wt. percent) | Cu (4.6) Pd (0.02) | Cu (5.0) Pd (0.1) | Cu (6.5) | Pd (0.15) | Cu (1.2) Pt (0.23) | Cu (4.6) Ir (0.05) | Cu (6.8) Fe (6.0) | Cu (8.6) Fe (3.8) Pd (0.04) | Cu (4.6) Ni (2.0) |
| Test Hours: | | | | | | | | | |
| 0 | 440 | 430 | 480 | 420 | 475 | 490 | 475 | 470 | 480 |
| 20 | 470 | 470 | 560 | 475 | 505 | 530 | 520 | 520 | 515 |
| 40 | 500 | 490 | 595 | 475 | 480 | 560 | 535 | 550 | 555 |
| 60 | 500 | 470 | 600 | 500 | 485 | 570 | 540 | 560 | 580 |
| 80 | 510 | 500 | 610 | 510 | 520 | (¹) | 560 | 550 | (¹) |
| 80-Hour Test: Catalyst bed temperature at inlet exhaust gas temperature of 540° F | 940 | 1,235 | ² 550 | 800 | 850 | 540 | 525 | 580 | ² 545 |

¹ Not determined.
² Results after approximately 60 hours.

and 0.04 percent palladium. It would be expected that this catalyst would be superior to catalyst A (4.6 percent copper and 0.02 percent palladium) because of its higher concentration of both copper and palladium. However, the iron contained in catalyst H must have served to poison the palladium, for catalyst H showed very poor results reaching a temperature of only 580° compared with 940° F. for catalyst A. These data serve to point out that at least with iron, including an additional metal to the copper-palladium system may not only fail to improve the efficiency but may give adverse results.

The foregoing tests clearly demonstrate that copper-palladium catalysts are extremely well suited for an exhaust gas application. As shown by the data of Table III, straight copper catalysts are very effective in promoting the oxidation of hydrocarbons and carbon monoxide under wide-open throttle conditions wherein equilibrium temperatures are of the order of 600° F. and above. On the other hand, a straight palladium catalyst is unacceptable in an exhaust gas application because of its extremely poor efficiency under these conditions. Surprisingly, the inclusion of palladium in a copper catalyst improves catalyst performance after a period of use. Thus after about 40 hours of use, a copper-palladium catalyst is superior to the copper catalyst which itself has a high degree of activity.

Even more striking is the ability of palladium to promote the activation of copper catalysts at relatively low temperatures, especially after the catalyst has been in use (Table IV). At the 80-hour point for an inlet exhaust gas temperature of 540° F., using a copper-palladium catalyst, the bed temperature rose to 1235° F. compared with 550° F. (60-hour point) for a straight copper catalyst and 800° F. for a straight palladium catalyst. In this regard the copper-palladium catalysts are markedly superior to copper catalysts containing metals similar to palladium such as platinum or iridium which attained only a temperature of 850 and 540° F. respectively. Moreover, the copper-palladium catalyst appears to be quite specific for the reaction contemplated. The inclusion of iron in the system not only failed to improve, but actually impaired catalyst performance.

An important feature of the catalysts of this invention is their excellent thermal stability properties. The catalyst bed temperatures under normal operation may vary from 400° to 1700° F. Under extreme conditions of severe acceleration and deceleration, bad temperatures as high as 1750° F. have been observed. Using catalysts of this invention, catalyst beds have been operated at these high temperatures without substantially affecting catalyst activity. The property of heat stability is very important because it obviates the necessity of installing a mechanical system to have the exhaust gas by-pass the catalyst bed in case of extremely high temperatures. Such a by-pass system would be required if catalysts were susceptible to damage at high temperatures. Good thermal stability is also desirable in that it allows the reaction to be carried out at higher temperatures wherein higher efficiencies may be attained. Furthermore, this property becomes important when considering the design of a commercial vehicle exhaust system incorporating an oxidation catalyst. The additional heat from the oxidation process would naturally tend to overheat the passenger compartment. This problem could be solved by insulating the catalyst bed and exhaust system. Of course, this expedient would be possible only if the catalyst could tolerate the higher temperatures due to the insulation.

Another feature of the catalysts of this invention is their ability to catalyze the oxidation of hydrocarbons and carbon monoxide without the concomitant oxidation of nitrogen. This is an important consideration for oxides of nitrogen and their subsequent reaction products readily contribute to the formation of photochemical smog and are eye and respiratory irritants.

Catalysts of this invention have been tested under actual operating conditions in modern automobiles with excellent results; namely, substantial oxidation of hydrocarbons and carbon monoxide, a discharge exhaust gas substantially free of noxious odors, activity at both high and low temperatures and under a wide variety of operation conditions, resistance to poisons in the exhaust stream, particularly lead salts. Our catalysts are particularly resistant to poisoning by sulfur compounds commonly found in gasolines. This is an important consideration for current commercial gasolines may contain up to 0.10 percent sulfur, and it could entail a significant expenditure to remove such compounds.

The fuels used during these tests contained a variety of modern fuel additives and the catalysts were remarkably resistant to poisoning from these varied sources. The vehicle tests, conducted under typical urban and country driving conditions, provided an opportunity to investigate the effects of physical and thermal shock on the catalyst material. These tests revealed that in spite of the many shocks and continual agitation, the resistance to attrition of the catalysts of this invention is such that special mechanical contrivances are not required to safeguard the catalyst material. The catalyst is simply put into a suitable container with openings to receive and discharge the exhaust gases. To firmly retain the catalyst material, the receiving and discharge openings are covered with wire screening. The container may have internal baffling to allow greatest contact between catalyst and exhaust gas, and/or to use the hot reaction gases to heat the incoming exhaust gases. The container may actually replace the vehicle muffler, or it may be incorporated into the conventional exhaust system of current vehicles. The catalyst bed may also be located in the exhaust manifold or in the tailpipe of the exhaust system.

To aid the oxidation, secondary air may or may not be introduced into the system. To obtain maximum efficiency, we have found it preferable to introduce secondary air into the system. This is accomplished by the use of a variable speed blower, so that the amount of secondary air varies with operating conditions. The secondary air supply may also be introduced as a natural flow through the use of an appropriate air scoop or the like.

Our catalysts can be used to convert the exhaust gas of any gasoline. The gasolines can be of the aliphatic, aromatic and olefinic type including both straight run and catalytically produced gasolines and any and all mixtures thereof. The gasolines can contain the usual additives including organolead and other antiknock agents, such as tetraethyllead, tetraphenyllead, tetramethyllead, mixtures of alkylleads, such as tetraethyllead-tetramethyllead mixtures, ferrocene, methylcyclopentadienyl manganese tricarbonyl, cyclopentadienyl nickel nitrosyl, scavengers, anti-oxidants, such as aromatic amines and diamines, 2,6-dialkyl- and 2,4,6-trialkyl phenols, dyes, deposit modifiers, including trimethyl phosphate, dimethylphenyl phosphate, and the like.

In addition to use in spark ignition internal combustion engines, the present catalyst may also be used to reduce or eliminate unburned hydrocarbons and carbon monoxide from the exhaust products of combustion processes in general. This includes the compression ignition engine, oil and coal furnaces, residual fuel burners, etc.

We claim:

1. A catalyst composition especially adapted to substantially oxidize the unburned hydrocarbons and carbon monoxide constituents of the exhaust gas of internal combustion engines, said composition consisting essentially of a major portion of alumina, from about 0.5 to 25 percent copper in an oxide form and from 0.01 to about 3 percent palladium.

2. The composition of claim 1 consisting essentially of a major portion of activated transitional alumina, from about one to 10 percent copper in an oxide form and from 0.03 to about one percent palladium.

3. A catalyst composition especially adapted to substantially oxidize the unburned hydrocarbons and carbon monoxide constituents of the exhaust gas of internal combustion engines, said composition consisting essentially of a major portion of a high specific surface area support, selected from the group consisting of activated transitional aluminas, aluminum silicates, aluminum gels, magnesium gels, thoria, magnesia and zirconia from about 0.5 to 25 percent copper in an oxide form and from 0.01 to about 3 percent palladium.

4. A catalyst composition especially adapted to substantially oxidize the unburned hydrocarbons and carbon monoxide constituents of the exhaust gas of internal combustion engines, said composition consisting essentially of a major portion of a high specific surface area support, selected from the group consisting of activated transitional aluminas, aluminum silicates, aluminum gels, magnesium gels, thoria, magnesia and zirconia from about 5 to about 31 percent cupric oxide and from about 0.01 to about 0.2 percent palladium.

5. A catalyst composition especially adapted to substantially oxidize the unburned hydrocarbons and carbon monoxide constituents of the exhaust gas of internal combustion engines, said composition consisting essentially of a major portion of a catalyst carrier selected from the group consisting of activated transitional aluminas, aluminum silicates, aluminum gels, magnesium gels, thoria, magnesia and zirconia having a surface area of at least 75 square meters per gram, from about 5 to 31 percent cupric oxide and from about 0.01 to about 0.2 percent palladium.

6. A catalyst composition especially adapted to substantially oxidize the unburned hydrocarbons and carbon monoxide constituents of the exhaust gas of internal combustion engines, said composition consisting essentially of a major portion of particles of transitional alumina having a surface area of about 360 square meters per gram, about 5 percent copper in an oxide form and about 0.1 percent palladium.

References Cited by the Examiner

UNITED STATES PATENTS

| | | | |
|---|---|---|---|
| 2,071,119 | 2/1937 | Harger | 23—2 |
| 2,802,889 | 8/1957 | Frevel et al. | 252—474 X |
| 2,867,497 | 1/1959 | Houdry et al. | 23—2 |
| 2,927,141 | 3/1960 | Cohn et al. | 252—474 X |
| 2,963,449 | 12/1960 | Nixon | 252—466 |
| 2,967,835 | 1/1961 | Hort | 252—474 X |
| 3,024,593 | 3/1962 | Houdry | 23—2.2 |
| 3,025,247 | 3/1962 | Oleck | 252—466 |
| 3,072,457 | 1/1963 | Bloch | 23—2.2 |
| 3,076,858 | 2/1963 | Frevel et al. | 252—474 X |
| 3,133,029 | 5/1964 | Hoekstra | 252—466 |

MAURICE A. BRINDISI, *Primary Examiner.*